United States Patent
Pai et al.

(10) Patent No.: US 8,948,263 B2
(45) Date of Patent: Feb. 3, 2015

(54) READ/WRITE SEPARATION IN VIDEO REQUEST MANAGER

(75) Inventors: Ramadas Lakshmikanth Pai, Bangalore (IN); Chhavi Kishore, Bangalore (IN); Srinivas Cheedella, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1037 days.

(21) Appl. No.: 10/816,118

(22) Filed: Apr. 1, 2004

(65) Prior Publication Data

US 2005/0169375 A1 Aug. 4, 2005

Related U.S. Application Data

(60) Provisional application No. 60/541,521, filed on Feb. 3, 2004.

(51) Int. Cl.
*H04N 11/02* (2006.01)
*H04N 19/423* (2014.01)
*H04N 19/44* (2014.01)
*H04N 19/61* (2014.01)

(52) U.S. Cl.
CPC ... *H04N 19/00484* (2013.01); *H04N 19/00533* (2013.01); *H04N 19/00781* (2013.01)
USPC ............. 375/240.16; 375/240.12; 375/240.24

(58) Field of Classification Search
CPC .................. H04N 19/00484; H04N 19/00533; H04N 19/00781
USPC ....................................... 375/240.16; 365/189
See application file for complete search history.

(56) References Cited

U.S. PATENT DOCUMENTS

| | | | | |
|---|---|---|---|---|
| 4,447,891 A * | 5/1984 | Kadota | ......................... | 365/154 |
| 4,694,357 A * | 9/1987 | Rahman et al. | ................ | 386/241 |
| 4,710,767 A * | 12/1987 | Sciacero et al. | .............. | 345/563 |
| 5,675,387 A * | 10/1997 | Hoogenboom et al. | . | 375/240.15 |
| 5,706,034 A * | 1/1998 | Katsura et al. | ................ | 345/539 |
| 5,706,059 A * | 1/1998 | Ran et al. | ...................... | 348/699 |
| 5,754,170 A * | 5/1998 | Ranganathan | ................ | 345/558 |
| 6,310,921 B1 * | 10/2001 | Yoshioka et al. | ........ | 375/240.26 |
| 6,880,056 B2 * | 4/2005 | Kootstra | ....................... | 711/168 |
| 6,950,337 B2 * | 9/2005 | Bellini et al. | ............ | 365/185.13 |
| 7,478,341 B2 * | 1/2009 | Dove | ............................ | 715/790 |

* cited by examiner

*Primary Examiner* — Anner Holder
(74) *Attorney, Agent, or Firm* — Foley & Lardner LLP; Christopher J. McKenna; Helen H. Zhang

(57) ABSTRACT

A video request manager comprises a first state machine. The first state machine commands a memory controller to fetch reference pixels for a first portion of a picture. The second state machine commands a memory controller to write a second portion of the picture.

20 Claims, 6 Drawing Sheets

US 8,948,263 B2

READ/WRITE SEPARATION IN VIDEO REQUEST MANAGER

RELATED APPLICATIONS

This application claims priority to "READ/WRITE SEPARATION IN VIDEO REQUEST MANAGER", U.S. Provisional Patent Application Ser. No. 60/541,521, filed Feb. 3, 2004, by Ramadas Lakshmikanth Pai, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Common video compression algorithms use compression based on temporal redundancies between pictures in the video. For example, MPEG-2 defines pictures that can be predicted from one other picture (a P-picture), two pictures (a B-picture), or not predicted from another picture at all (an I-picture).

Portions, known as macroblocks, from B and P pictures are predicted from reference pixels in a reference picture. The reference pixels can be spatially displaced from the macroblock that is predicted therefrom. Accordingly, the macroblock is encoded as a prediction error, along with indicator(s) indicating the spatial displacements of the reference pixels from the position of the macroblock. The indicator(s) is known as a motion vector.

During decoding, the video decoder uses the motion vectors to retrieve the reference pixels. The reference pixels are retrieved from a memory storing the reference frame. The memory storing the reference frame is known as a frame buffer. A motion vector address computer determines the appropriate addresses storing the reference pixels for a macroblock, based on the motion vectors. A video request manager makes a read request to a memory controller for the reference pixels at the address calculated by the motion vector address computer. The memory controller provides the reference pixels to a pixel reconstructor.

The pixel reconstructor applies the prediction error to the reference pixels, thereby recovering the macroblock. The video decoder then writes the macroblock to the frame buffer. The video request manager makes a write request to the memory controller to write the macroblock to the frame buffer.

As can be seen, decoding a predicted macroblock can include read and write transactions. A standard definition television picture comprises 45×30 macroblocks. A video sequence can include 30 frames/second. Accordingly, there is a limited time for decoding frames for display in real time. If each macroblock decode requires the time for read transaction(s) and a write transaction, it becomes increasingly difficult to display the frames in real time.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are systems and methods for read and write thread separation in a video request manager.

In one embodiment, there is presented a video request manager. The video request manager comprises a first state machine for commanding a memory controller to fetch reference pixels for a first portion of a picture. The second state machine for commanding a memory controller to write a second portion of the picture.

In another embodiment, there is presented a circuit for decoding video data. The circuit comprises a motion vector address computer, a motion compensator, and a video request manager. The motion vector address computer calculates at least one address for reference pixels for a first portion of a picture. The motion compensator decodes another portion of the picture. The video request manager comprises a first state machine for issuing a command to fetch reference pixels for a first portion of a picture and a second state machine for issuing a command to write a second portion of the picture.

In another embodiment, there is presented a method for decoding video data. The method comprises calculating at least one address for reference pixels for a first portion of a picture; decoding another portion of the picture; issuing a command to fetch reference pixels for a first portion of a picture; and issuing a command to write a second portion of the picture.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
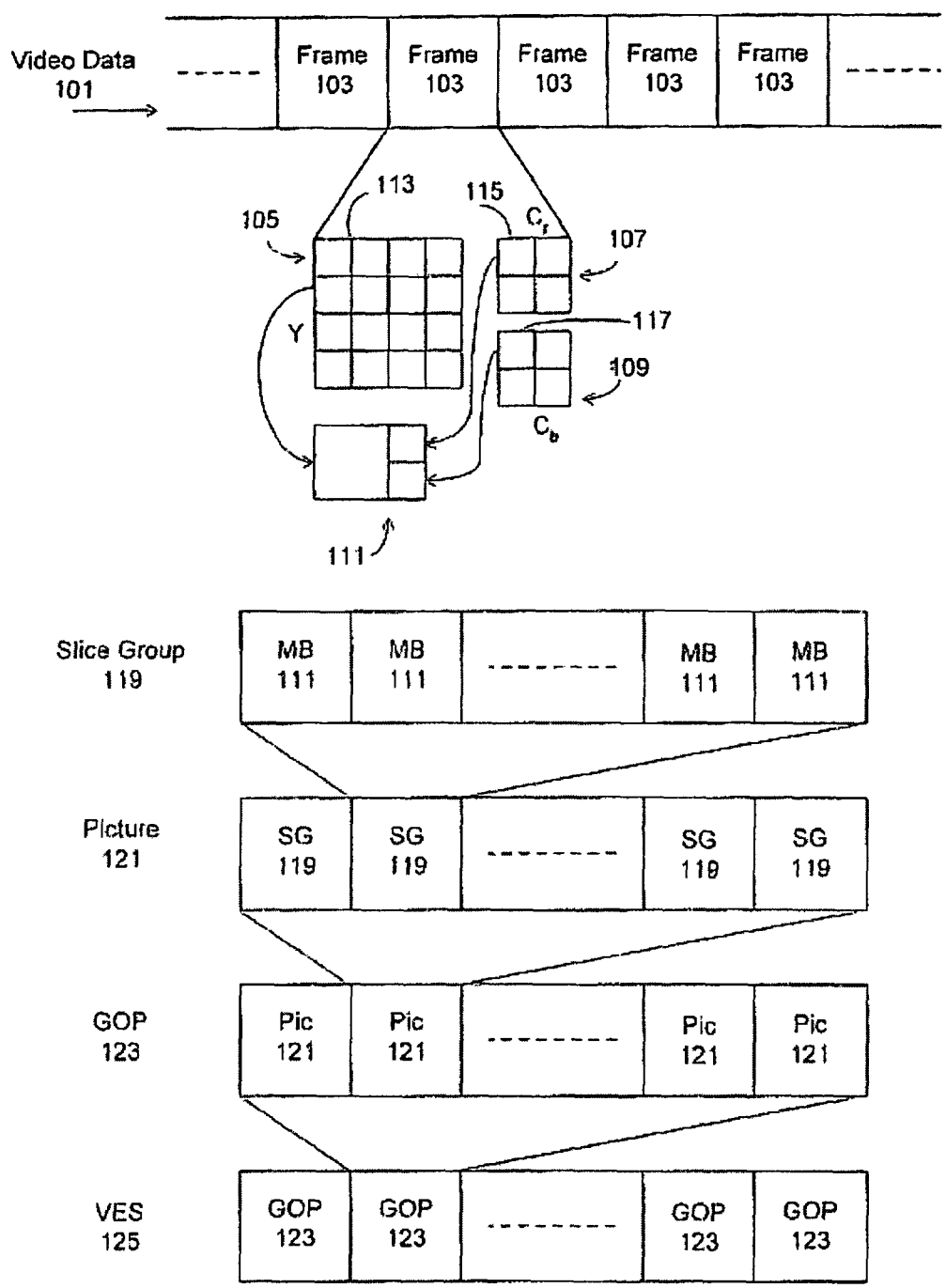
FIG. 1a is a block diagram of an exemplary Moving Picture Experts Group (MPEG) encoding process, in accordance with an embodiment of the present invention.

FIG. 1a illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red Cr, 107, and chrominance blue $C_b$, 109, pixels. The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitates utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, many of the macroblocks 111 are compared to pixels of other frames 103 (reference frames). When an appropriate (most similar, i.e. containing the same object(s)) portion of a reference frame 103 is found, the differences between the portion of the reference frame 103 (reference pixels) and the macroblock 111 are encoded. The difference between the portion of the reference frame 103 and the macroblock 111, the prediction error, is encoded using the discrete cosine transformation, thereby resulting in frequency coefficients. The frequency coefficients are then quantized and Huffman coded.

The location of the reference pixels in the reference frame 103 is recorded as a motion vector. The motion vector describes the spatial displacement between the macroblock 111 and the reference pixels. The encoded prediction error and the motion vector form part of the data structure encoding the macroblock 111. In the MPEG-2 standard, the macroblocks 111 from one frame 103 (a predicted frame) are limited to prediction from reference pixels of no more than two reference frames 103. It is noted that frames 103 used as a reference frame for a predicted frame 103, can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

Figure 1B:
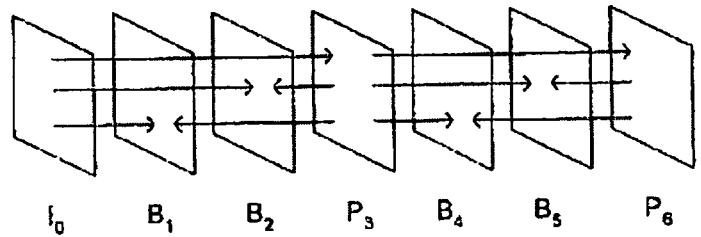
FIG. 1b is an exemplary sequence of frames in display order, in accordance with an embodiment of the present invention.

$I_0$, $B_1$, $B_2$, $P_3$, $B_4$, $B_5$, and $P_6$, FIG. 1b, are exemplary pictures. The arrows illustrate the temporal prediction dependence of each picture. For example, picture $B_2$ is dependent on reference pictures $I_0$, and $P_3$. Pictures coded using temporal redundancy with respect to exclusively earlier pictures of the video sequence are known as predicted pictures (or P-pictures), for example picture $P_3$ is coded using reference picture $I_0$. Pictures coded using temporal redundancy with respect to earlier and/or later pictures of the video sequence are known as bi-directional pictures (or B-pictures), for example, pictures $B_1$ is coded using pictures $I_0$ and $P_3$. Pictures not coded using temporal redundancy are known as I-pictures, for example $I_0$. In the MPEG-2 standard, I-pictures and P-pictures are also referred to as reference pictures.

Figure 1C:
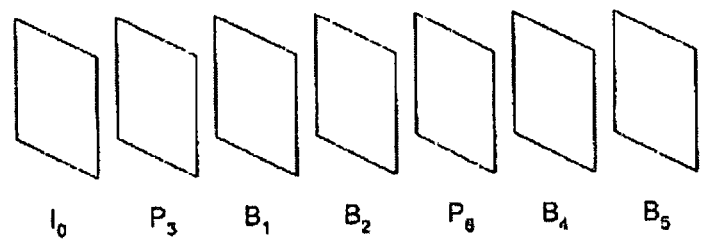
FIG. 1c is an exemplary sequence of frames in decode order, in accordance with an embodiment of the present invention.

The foregoing data dependency among the pictures requires decoding of certain pictures prior to others. Additionally, the use of later pictures as reference pictures for previous pictures requires that the later picture be decoded prior to the previous picture. As a result, the pictures may be decoded in a different order than the order in which they will be displayed on the screen. Accordingly, the pictures are transmitted in data dependent order, and the decoder reorders the pictures for presentation after decoding. $I_0$, $P_3$, $B_1$, $B_2$, $P_6$, $B_4$, $B_5$, FIG. 1c, represent the pictures in data dependent and decoding order, different from the display order seen in FIG. 1b.

The pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence. Each packet is then associated with a transport header, forming what are known as transport packets.

The transport packets can be multiplexed with other transport packets carrying other content, such as another video elementary stream 125 or an audio elementary stream. The multiplexed transport packets form what is known as a transport stream. The transport stream is transmitted over a communication medium for decoding and displaying.

Figure 2:
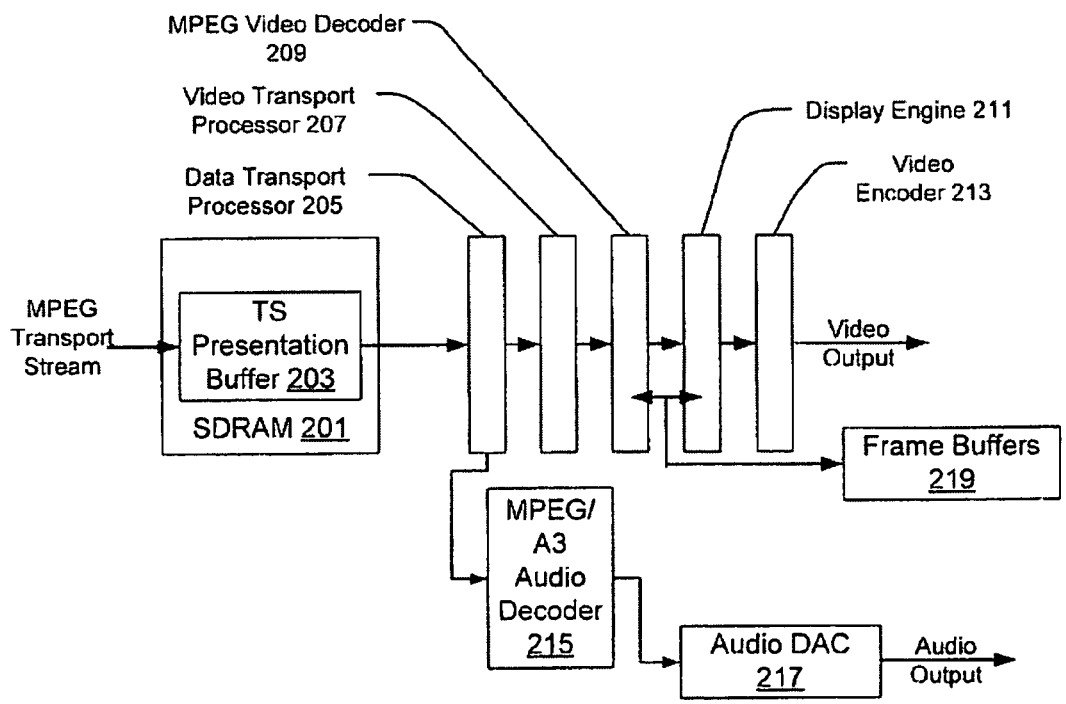
FIG. 2 is a block diagram of an exemplary decoder system in accordance with an embodiment of the present invention.

FIG. 2 illustrates a block diagram of an exemplary circuit for decoding the compressed video data, in accordance with an embodiment of the present invention. Data is received and stored in a presentation buffer 203 within a Synchronous Dynamic Random Access Memory (SDRAM) 201. The data can be received from either a communication channel or from a local memory, such as, for example, a hard disc or a DVD.

The data output from the presentation buffer 203 is then passed to a data transport processor 205. The data transport processor 205 demultiplexes the transport stream into packetized elementary stream constituents, and passes the audio transport stream to an audio decoder 215 and the video transport stream to a video transport processor 207 and then to a MPEG video decoder 209. The audio data is then sent to the output blocks, and the video is sent to a display engine 211.

The display engine 211 scales the video picture, renders the graphics, and constructs the complete display. Once the display is ready to be presented, it is passed to a video output encoder 213 where it is converted to analog video using an internal digital to analog converter (DAC). The digital audio is converted to analog in an audio digital to analog converter (DAC) 217.

The decoder 209 decodes at least one picture, i.e., one of $I_0$, $B_1$, $B_2$, $P_3$, $B_4$, $B_5$, $P_6$ . . . , during each frame display period. Due to the presence of the B-pictures, $B_1$, $B_2$, the decoder 209 decodes the pictures, $I_0$, $B_1$, $B_2$, $P_3$, $B_4$, $B_5$, $P_6$ . . . in an order that is different from the display order. The decoder 209 decodes each of the reference pictures prior to each picture that is predicted from the reference picture. For example, the decoder 209 decodes $I_0$, $B_1$, $B_2$, $P_3$, in the order, $I_0$, $P_3$, $B_1$, and $B_2$. After decoding $I_0$, the decoder 209 writes $I_0$ to a frame buffer 220 and decodes $P_3$. the frame buffer 220 can comprise a variety of memory systems, for example, a DRAM. The macroblocks of $P_3$ are encoded as prediction errors with respect to reference pixels in $I_0$. The reference pixels are indicated by motion vectors that are encoded with each macroblock of $P_3$. Accordingly, the video decoder 209 uses the motion vectors encoded with the macroblocks of $P_3$ to fetch the reference pixels. Similarly, the video decoder 209 uses motion vectors encoded with the macroblocks of $B_1$ and $B_2$ to locate reference pixels in $I_0$ and $P_3$.

Figure 3:
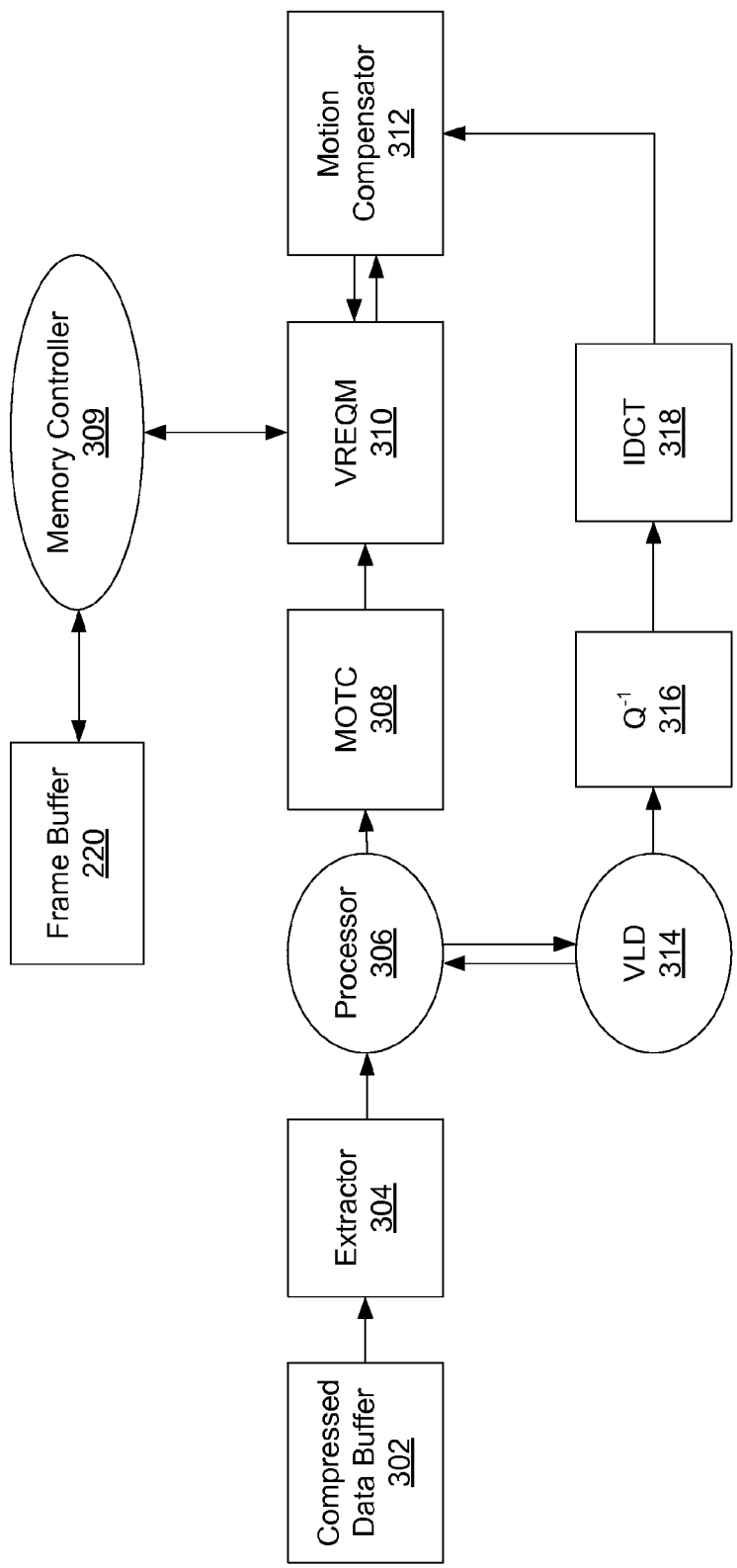
FIG. 3 is a block diagram of an exemplary video decoder in accordance with an embodiment of the present invention.

Referring now to FIG. 3, there is illustrated a block diagram of an exemplary video decoder 209 in accordance with an embodiment of the present invention. The video decoder 209 comprises a compressed data buffer 302, an extractor 304, a processor 306, a motion vector address computer 308, a video request manager 310, a motion compensator 312, a variable length decoder 314, an inverse quantizer 316, and an inverse discrete cosine transformation module 318.

The video decoder 209 fetches data from the compressed data buffer 302, via an extractor 304 that provides the fetched data to a processor 306. the video decoder 209 decodes at least one picture per frame display period on a macroblock by macroblock basis. At least a portion of the data forming the picture is encoded using variable length code symbols. Accordingly, the variable length coded symbols are provided to a variable length decoder 314. The portions of the data that can be encoded using variable length codes can include the parameters, such as picture type, prediction type, progressive frame, and the motion vectors, as well as the encoded pixel data (frequency coefficients). The parameters are provided to the processor 306, while the frequency coefficients are provided to the inverse quantizer 316. The inverse quantizer 316 inverse quantizes the frequency coefficients and the IDCT module 318 transforms the frequency coefficients to the pixel domain.

If the macroblock is from an I-picture, the pixel domain data represents the pixels of the macroblock. If the macroblock is from a P-picture, the pixel domain data represents the prediction error between the macroblock and reference pixels from one other frame. If the macroblock is from a B-picture, the pixel domain data represents the prediction error between the macroblock and reference pixels from two other frames.

Where the macroblock is from a P or B picture, the video decoder 209 fetches the reference pixels from the reference frame(s) 103. The reference frame(s) is stored in a frame buffer(s) 220. The processor 306 provides the motion vectors encoded with the macroblock 111 to the motion vector address computer 308. The motion vector address computer 308 uses the motion vectors to calculate the address of the reference pixels in the frame buffer 220.

When the motion vector address computer 308 calculates the addresses associated with the reference pixels, the video request manager 310 commands a memory controller 309 to fetch pixels at the addresses calculated by the motion vector address computer 308 and provide them to a motion compensator 312. The motion compensator 312 applies the prediction error from the macroblock 111 to the fetched reference pixels, resulting in the decoded macroblock 111. The video request manager 310 then commands the memory controller 309 to write the decoded macroblock 111 to the frame buffer 220.

As can be seen, the decoding of a macroblock can include read transactions for fetching chroma blocks, and luma blocks from as many as two frames. A standard definition television picture comprises 45×30 macroblocks. A video sequence can include 30 frames/second. Accordingly, there is a limited time for decoding frames for display in real time.

Figure 4:
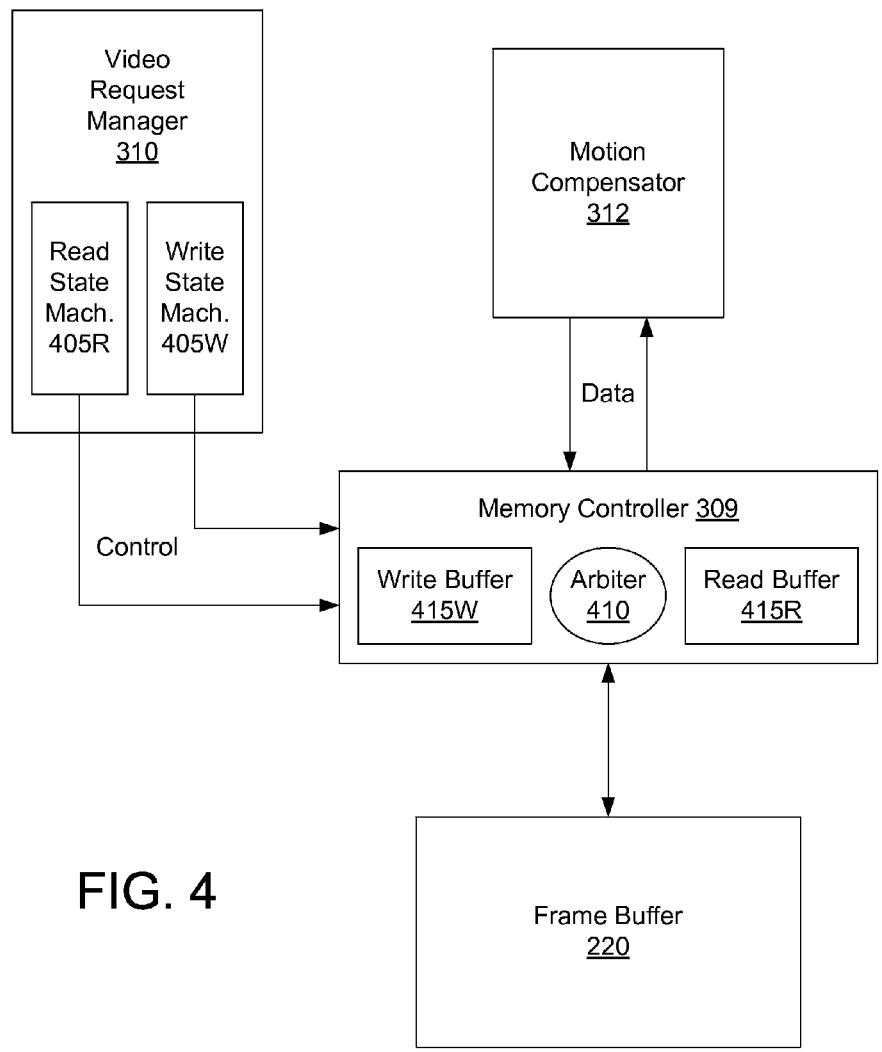
FIG. 4 is a block diagram of the video request manager, motion compensator, memory controller interface in accordance with an embodiment of the present invention.

Referring now to FIG. 4, there is illustrated a block diagram of the video request manager 310, motion compensator 312, and memory controller 309 interface. In order to reduce the time required to decode macroblocks, the video request manager 310 includes separate state machines for the read 405R and write 405W transactions. The read state machine 405R and the write state machine 405W can operate simultaneously. Accordingly, portions of a write transaction for a first macroblock can be concurrent with portions of a read transaction for a second macroblock. Additionally, one of either the luma blocks or chroma blocks can be written while the other one of either is read.

For example, while the motion compensator 312 applies a prediction error from a first macroblock to decode the first macroblock, the motion vector address computer 308 can determine the addresses of reference pixels for a second macroblock. After the motion compensator 312 decodes the macroblock, the video request manager 310, via a read state machine 405R, commands the memory controller 309 to fetch the reference pixel for the second macroblock and, via the write state machine 405W, commands the memory controller 309 to write the decoded macroblock from the motion compensator 312 to the frame buffer 220. The foregoing results in a resource contention on the bus between the memory controller 309 and the frame buffer 220. The memory controller 309 will arbitrate the read and write requests.

In one embodiment, an arbiter 410 in the memory controller 309 gives priority to the read transaction, causing the memory controller 309 to fetch the reference pixels. However, while the read transaction occurs, the memory controller 309 also prepares for the write transaction. The preparations for the write transaction include loading a write buffer 415W in the memory controller 309 with the decoded macroblock. The memory controller 309 also includes a read buffer 415R. When the read transaction is completed, the memory controller 309 proceeds to the write transaction, writing the decoded macroblock from the write buffer to the frame buffer 220. As can be seen, the transfer of the decoded macroblock from the motion compensator 312 occurs concurrently with reading the reference pixels for another macroblock, resulting in time savings.

Alternatively, while the motion compensator 312 applies the luma portion of the prediction error to the luma reference pixels, the motion vector address computer 308 can determine the addresses of reference pixels for the chroma reference pixels. After the motion compensator 312 decodes the luma blocks of the macroblock, the video request manager 310, via a read state machine 405R, commands the memory controller 309 to fetch the reference pixel for the chroma blocks of the macroblock and, via the write state machine 405W, commands the memory controller 309 to write the decoded luma blocks from the motion compensator 312 to the frame buffer 220. The foregoing results in a resource contention on the bus between the memory controller 309 and the frame buffer 220. The memory controller 309 will arbitrate the read and write requests.

In one embodiment, an arbiter 410 in the memory controller 309 gives priority to the read transaction, causing the memory controller 309 to fetch the chroma reference pixels. However, while the read transaction occurs, the memory controller 309 also prepares for the write transaction. The preparations for the write transaction include loading a write buffer 415W in the memory controller 309 with the decoded luma blocks of the macroblock. When the read transaction is completed, the memory controller 309 proceeds to the write transaction, writing the decoded luma blocks from the write buffer to the frame buffer 220. As can be seen, the transfer of the luma blocks from the motion compensator 312 occurs concurrently with reading the chroma reference pixels for the macroblock, resulting in time savings. The foregoing can also occur vice versa (the chroma blocks are written and the luma reference pixels are fetched).

It is noted that in alternative embodiments, the read state machine 405R can issue the read command slightly ahead of the write state machine 405W issuing the write command. This will also cause the arbiter 410 to give priority to the read command.

Figure 5:
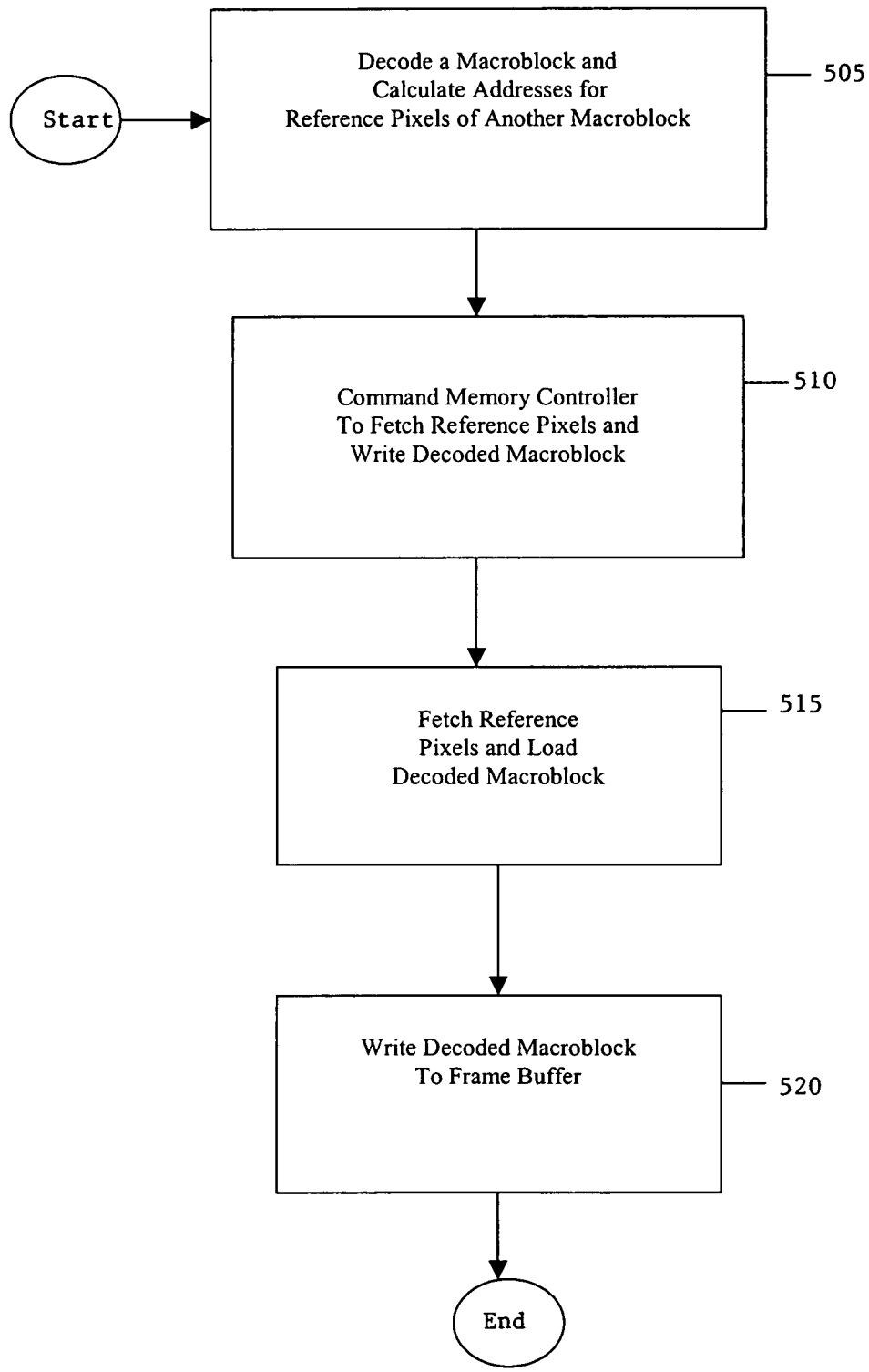
FIG. 5 is a flow diagram for decoding video data in accordance with an embodiment of the present invention.

Referring now to FIG. 5, there is illustrated a flow diagram for decoding video data in accordance with an embodiment of the present invention. At 505, the motion compensator applies the prediction error for a first macroblock, while the motion vector address computer 308 calculates the address for the reference pixels of another macroblock. After the motion compensator 312 decodes the macroblock, the video request manager 310, via a read state machine 405R, commands (510) the memory controller 309 to fetch the reference pixels for the second macroblock and, via the write state machine 405W, commands (510) the memory controller 309 to write the decoded macroblock from the motion compensator 312 to the frame buffer 220.

The arbiter 410 in the memory controller 309 gives priority to the read transaction, causing the memory controller 309 to fetch (515) the reference pixels. However, while the read transaction occurs, the memory controller 309 also loads (515) a write buffer 415W in the memory controller 309 with the decoded macroblock 309. When the read transaction is completed, the memory controller 309 proceeds to the write transaction, writing (520) the decoded macroblock from the write buffer to the frame buffer 220.

Figure 6:
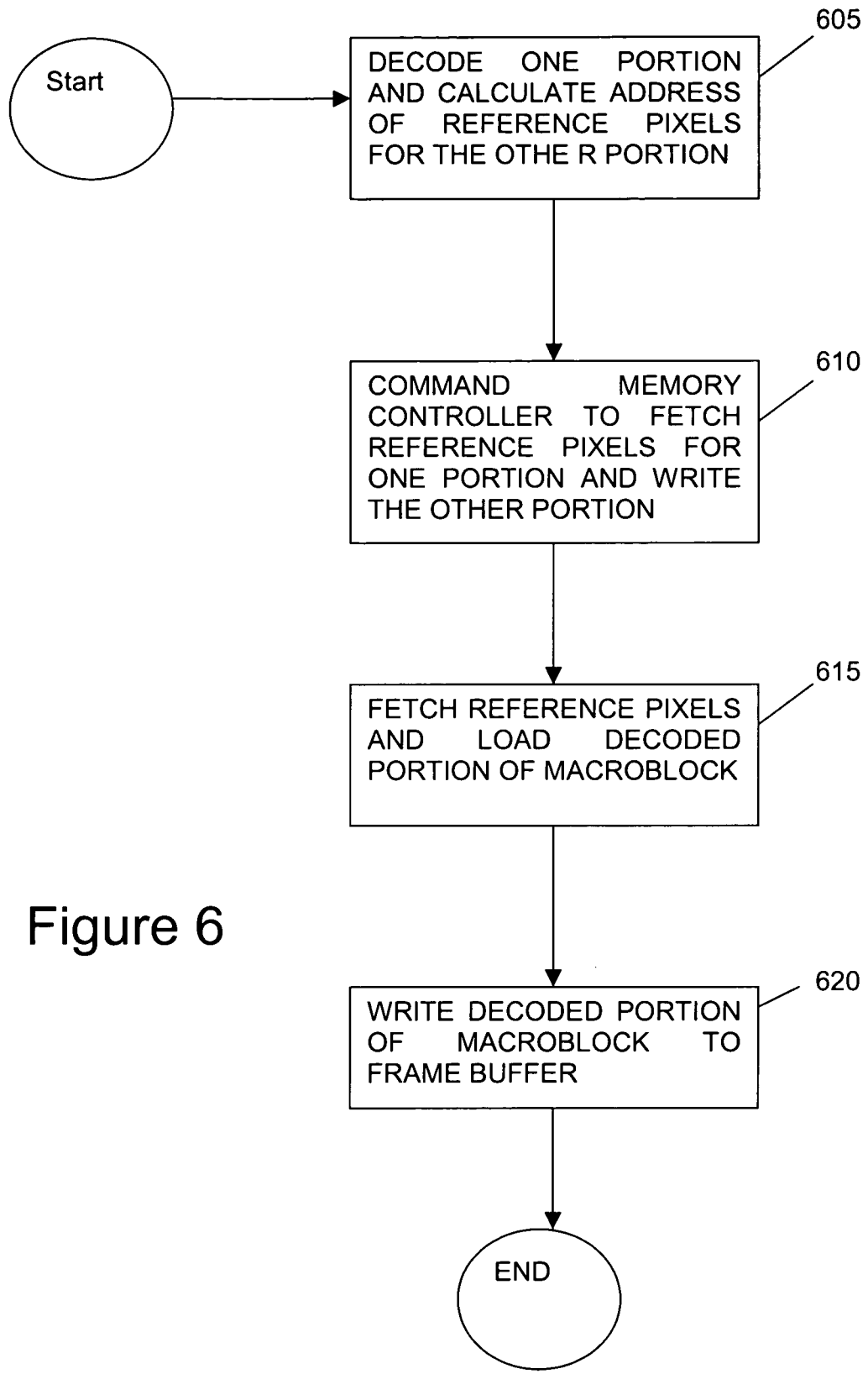
FIG. 6 is a flow diagram for decoding a video data in accordance with an embodiment of the present invention.

Referring now to FIG. 6, there is illustrated a flow diagram for decoding video data in accordance with an embodiment of the present invention. At 605, the motion compensator applies the one of either the luma portion or the chroma portion of the prediction error, while the motion vector address computer 308 calculates the address for the reference pixels of the other of the luma portion or chroma portion. After the motion compensator 312 decodes the one of either the luma portion or chroma portion, the video request manager 310, via a read state machine 405R, commands (510) the memory controller 309 to fetch the reference pixels of the other portion, and via the write state machine 405W, commands (510) the memory controller 309 to write the decoded portion from the motion compensator 312 to the frame buffer 220.

The arbiter 410 in the memory controller 309 gives priority to the read transaction, causing the memory controller 309 to fetch (515) the reference pixels. However, while the read transaction occurs, the memory controller 309 also loads (515) a write buffer 415W in the memory controller 309 with the decoded blocks. When the read transaction is completed, the memory controller 309 proceeds to the write transaction, writing (520) the decoded blocks from the write buffer to the frame buffer 220.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A video request manager comprising:
a first state machine configured to command a memory controller to fetch reference pixels for a first portion of a picture; and
a second state machine configured to command the memory controller to write a second portion of the picture,
wherein in response to a resource contention between the command to fetch the reference pixels for the first portion of the picture and the command to write the second portion of the picture, the memory controller gives priority to the command to fetch the reference pixels for the first portion of the picture over the command to write the second portion of the picture, and
wherein the second state machine loads the memory controller with the second portion of the picture while the memory controller concurrently fetches the reference pixels for the first portion of the picture.

2. The video request manager of claim 1, wherein the second state machine commands the memory controller to write the second portion to a frame buffer, such that the resource contention occurs between the command to fetch the reference pixels from the frame buffer, and the command to write the second portion to the frame buffer.

3. A circuit for decoding video data, comprising:
a motion vector address computer configured to calculate at least one address for reference pixels for a first portion of a picture;
a motion compensator configured to apply a prediction error from a second portion of the picture to reference pixels fetched for the second portion of the picture;
a video request manager comprising:
a first state machine configured to issue a command to fetch the reference pixels for the first portion of the picture; and
a second state machine configured to issue a command to write the second portion of the picture; and
a memory controller configured to fetch the reference pixels for the first portion after the first state machine issues the command to fetch, and write the second portion of the picture after the second state machine issues the command to write, and
wherein the second portion of the picture is loaded in the memory controller while the memory controller concurrently fetches the reference pixels for the first portion of the picture, and
wherein the motion compensator applies the prediction error from the second portion of the picture to the reference pixels fetched for the second portion of the picture while the motion vector address computer concurrently calculates the at least one address for the reference pixels for the first portion of the picture.

4. The circuit of claim 3, wherein the memory controller further comprises:
an arbiter for causing the memory controller to give priority to the command to fetch the reference pixels for the first portion of the picture over the command to write the second portion of the picture.

5. The circuit of claim 3, wherein the memory controller further comprises:
a write buffer for storing the second portion of the picture while concurrently fetching the reference pixels for the first portion of the picture.

6. The circuit of claim 5, wherein the memory controller is further configured to write the second portion of the picture from the write buffer to a memory system, after fetching the reference pixels for the first portion of the picture.

7. The video request manager of claim 1, wherein the second state machine loads a buffer of the memory controller with the second portion while the memory controller concurrently fetches the reference pixels for the first portion of the picture.

8. The video request manager of claim 1, wherein the first portion of the picture is decoded using the reference pixels fetched for the first portion of the picture to generate the decoded first portion of the picture.

9. The circuit of claim 3, wherein the motion vector address computer is further configured to calculate at least one address for the reference pixels for the second portion of the picture.

10. The circuit of claim 9, wherein the motion compensator is configured to decode the second portion of the picture using the reference pixels fetched for the second portion of the picture.

11. The circuit of claim 9, wherein the memory controller is further configured to fetch the reference pixels for the second portion of the picture based upon the at least one address for the reference pixels for the second portion of the picture.

12. The circuit of claim 3, wherein the memory controller is further configured to fetch the reference pixels for the second portion of the picture after the first state machine issues the command to fetch the reference pixels for the second portion of the picture, and write the first portion of the picture after the second state machine issues the command to write the first portion, and wherein the first portion of the picture is loaded in a write buffer of the memory controller while the memory controller concurrently fetches the reference pixels for the second portion of the picture.

13. The circuit of claim 12, wherein the memory controller writes the first portion of the picture from the write buffer to a memory system, after fetching the reference pixels for the second portion of the picture.

14. A circuit for decoding video data, comprising:
a video request manager comprising:
a first state machine configured to issue a command to fetch, from a frame buffer, reference pixels for an encoded portion of a picture; and
a second state machine configured to issue a command to write, to the frame buffer, a decoded portion of the picture; and
a memory controller configured to fetch the reference pixels for the encoded portion of the picture in response to the command issued by the first state machine, and write the decoded portion of the picture in response to the command issued by the second state machine,
wherein in response to a resource contention between the command to fetch the reference pixels for the encoded portion of the picture and the command to write the decoded portion of the picture, the memory controller gives priority to the command to fetch the reference pixels for the encoded portion of the picture over the command to write the decoded portion of the picture, and
wherein the decoded portion of the picture is loaded in a write buffer of the memory controller while the memory controller concurrently fetches the reference pixels for the encoded portion of the picture.

15. The circuit of claim 14, wherein the reference pixels are chroma reference pixels to decode the encoded portion of the picture and the decoded portion of the picture is a decoded luma portion of the picture.

16. The circuit of claim 14, wherein the reference pixels are luma reference pixels to decode the encoded portion of the picture and the decoded portion of the picture is a decoded chroma portion of the picture.

17. The video request manager of claim 1, wherein:
the first portion of the picture is a chroma portion of the picture, and
the second portion of the picture is a luma portion of the picture.

18. The video request manager of claim 1, wherein:
the first portion of the picture is a luma portion of the picture, and
the second portion of the picture is a chroma portion of the picture.

19. The circuit of claim 3, wherein:
the first portion of the picture is a chroma portion of the picture, and
the second portion of the picture is a luma portion of the picture.

20. The circuit of claim 3, wherein:
the first portion of the picture is a luma portion of the picture, and
the second portion of the picture is a chroma portion of the picture.

* * * * *